United States Patent Office 3,134,693
Patented May 26, 1964

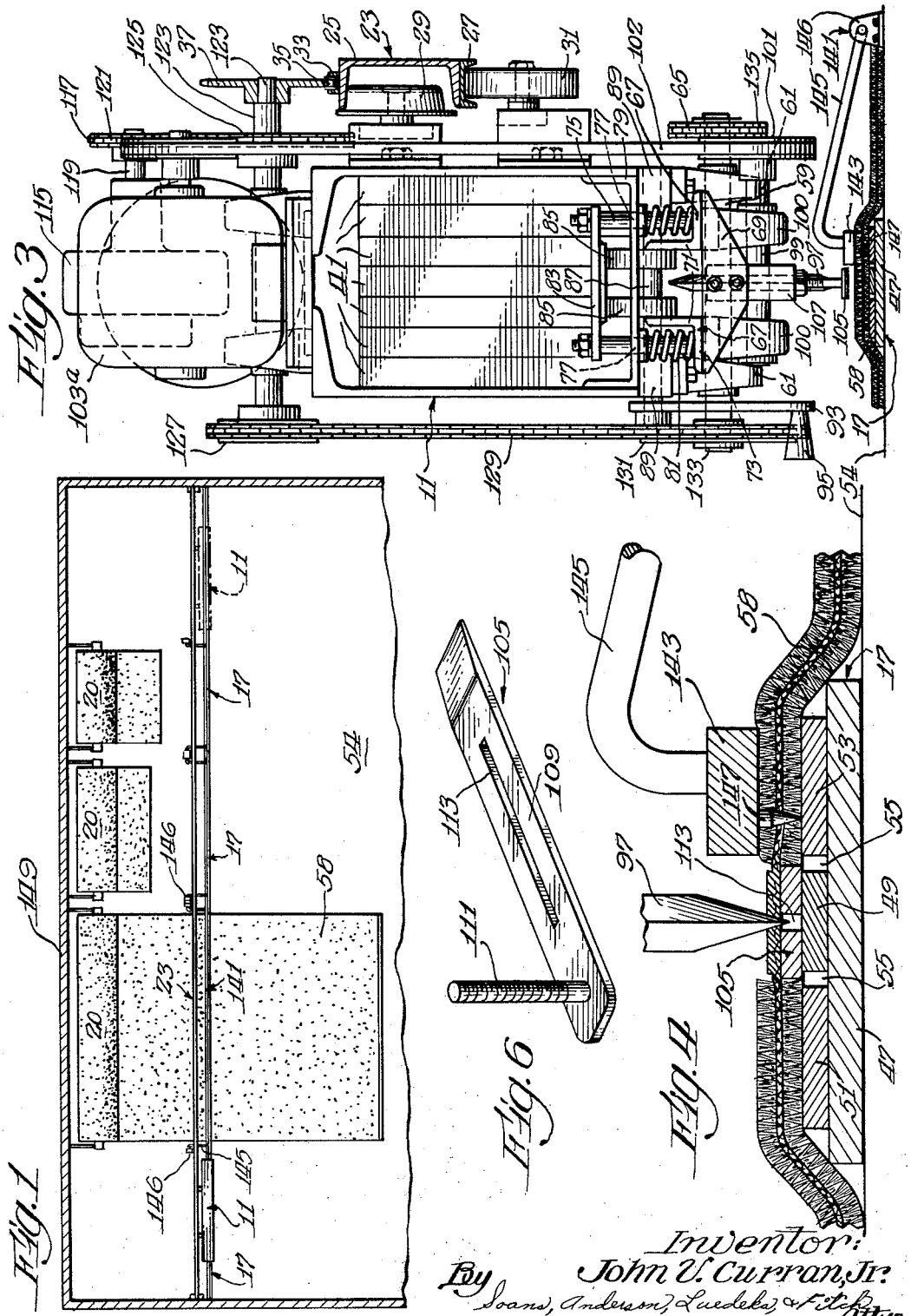
May 26, 1964  J. V. CURRAN, JR  3,134,693
APPARATUS FOR BONDING CARPET EDGING
Filed June 27, 1960  3 Sheets-Sheet 1
Inventor:
John V. Curran, Jr.
By Soans, Anderson, Luedeka & Fitch
Attys.

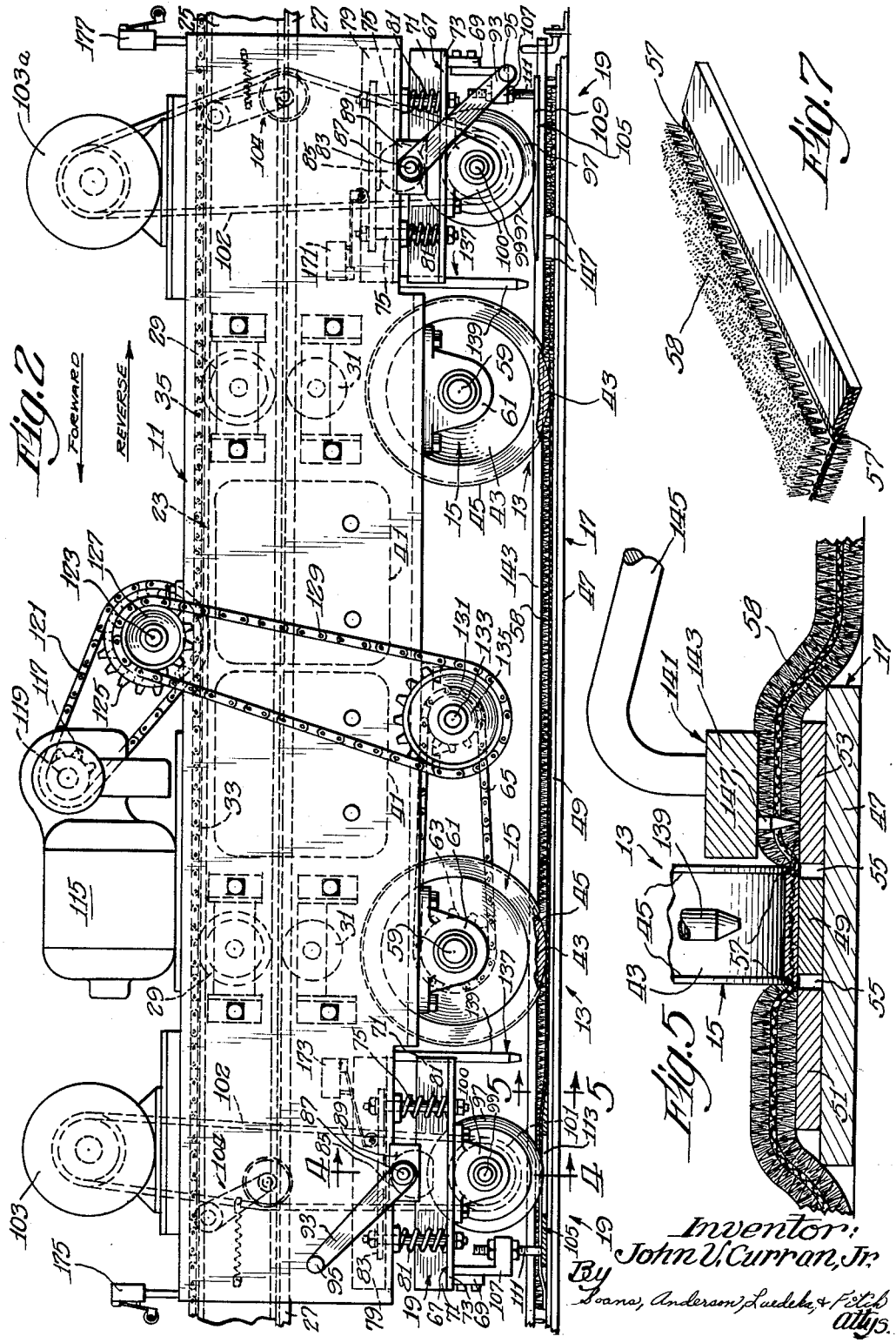

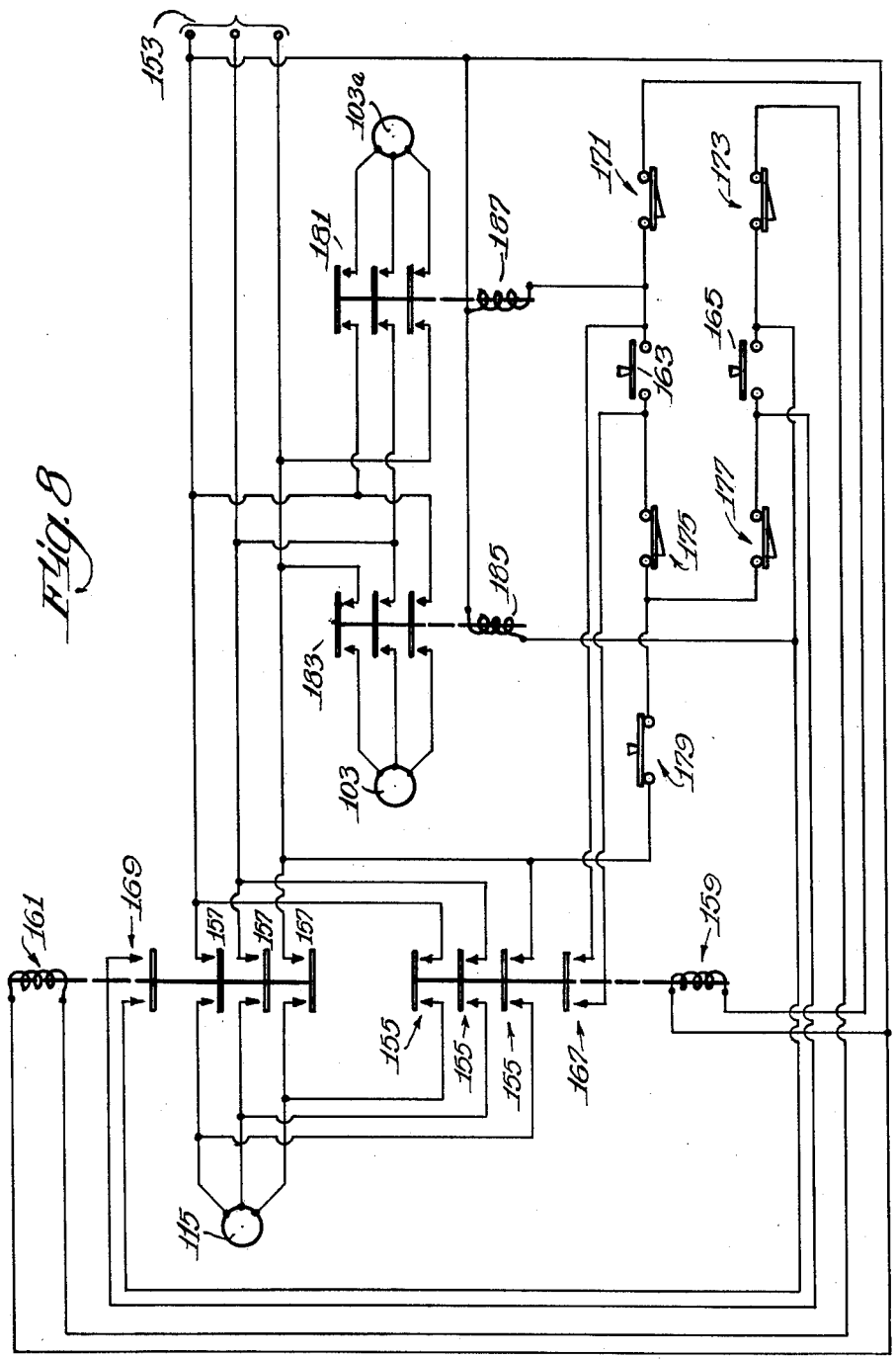

3,134,693
APPARATUS FOR BONDING CARPET EDGING
John V. Curran, Jr., 1549 Monroe Ave.,
River Forest, Ill.
Filed June 27, 1960, Ser. No. 39,073
4 Claims. (Cl. 118—4)

This invention relates to the cutting and bonding of carpet, and in particular to an apparatus which will cut carpet and at the same time provide a bonding for the portion of the carpet adjoining the freshly cut edges.

At the present time, commercial carpeting is generally manufactured in large rolls which contain a considerable length of carpet. These rolls are normally disposed on a series of racks in distribution warehouses in such a manner that a length of carpet may be unrolled and cut off as needed.

Like most fabrics, the freshly cut edges of a carpet, particularly a basket-woven carpet or the like, have a tendency to ravel, and it has been desirable to bind these edges in some manner before delivery of the carpet to the customer. Prior to the present invention, binding of the carpet was accomplished by fastening another piece of fabric around the freshly cut edge. This fastening was generally accomplished by some form of stitching operation and was quite time-consuming since it was difficult to position the binding fabric around the freshly cut edge of the carpet and stitch it at the same time. Nevertheless, both edges were generally bound in this manner each time a cut was made.

It is an object of this invention to provide an improved apparatus for bonding the portion of a carpet which adjoins the freshly cut edges of the carpet. It is a further object of this invention to provide an apparatus for cutting a carpet while at the same time providing such a bonding for said portion of the carpet. A still further object of the invention is to provide an apparatus of the character described which accomplishes these objects in both a rapid and economical manner. It is also an object of this invention to provide an improved carpet including a bonded cut edge. Further objects and advantages of the invention will become apparent with reference to the accompanying description, including the enclosed drawings in which:

FIGURE 1 is a diagrammatic illustration of the manner in which the invention is employed;

FIGURE 2 is a front view of an apparatus in accordance with the present invention;

FIGURE 3 is an enlarged end view of the apparatus of FIGURE 2;

FIGURE 4 is an enlarged, fragmentary sectional view of the cutting means, taken along the line 4—4 in FIGURE 2, as it appears engaging the carpet;

FIGURE 5 is an enlarged sectional view of the bonding means, taken along the line 5—5 in FIGURE 2, as it appears engaging the carpet;

FIGURE 6 is a perspective view of the carpet lifting means, seen also in FIGURE 2, which aids in the cutting operation;

FIGURE 7 is a perspective view of a carpet provided with a bonding in accordance with the present invention; and FIGURE 8 is a wiring diagram of the electrical control circuit for the apparatus.

Very generally the invention comprises an apparatus for cutting carpet, while at the same time providing a bonding for a portion of the carpet which is adjacent the freshly cut edges. The method comprises the distribution of a bonding material over the portion of the carpet which includes the line along which the cut is to be made, the compression of the bonding material into the carpet while confining the flow of the bonding material to a predetermined width, and the cutting of the carpet along a line contained within the area defined by the compressed portion. The invention also comprises an apparatus for effecting the method, and involves the use of a carriage 11 which is adapted to be passed over the carpet and accomplish the bonding and cutting. The carriage has associated therewith a compressing and confining means 13 which includes a pair of compressing and confining wheels 15 and a track 17. A cutting assembly 19 is located at each end of the carriage to provide the cut.

In the operation of the apparatus, a length of carpet is removed from a carpet roll 20 and draped across the track 17. The carriage is then passed over the carpet and track and the compressing and confining wheels 15 cooperate with the track to compress the bonding material into the carpet in a manner which will result in a thoroughly impregnated strip, within which the cutter assembly subsequently provides the cut.

It is desirable that the bonding phase of the operation be completed before the cutting phase is begun. However, it will be noted that a cutter assembly 19 is located at each end of the carriage, one of which assemblies would normally cut the carpet before either of the compressing and confining wheels came into contact therewith. The lead cutter assembly is therefore generally elevated for each pass which the carriage makes. In this manner, the carpet will be bonded and then cut.

More specifically, and with reference to FIGURES 2 and 3, the invention comprises the carriage 11 supported by the track 17 and also by an elevated beam structure 23 which extends the length of the track and is parallel thereto. The beam structure 23 comprises an upper channel member 25 and an inverted lower channel member 27 which cooperate with two pairs of guide wheels 29 and 31, respectively, to provide both vertical and horizontal support for the carriage. A small elongated channel 33 is fixed on the upper surface of the beam 25 and a sprocket chain 35 is fixed therein along its length to provide, in effect, a gear and rack arrangement for driving the carriage along its track. The driving means will be referred to in more detail in another portion of the specification.

The carriage 11 carries within it suitable weights 41 which supply the force necessary to create a bonding pressure which will satisfactorily impregnate the carpet with the bonding material. While the amount of weight used may vary somewhat with the type of carpet and the size of the compressing and confining wheels 15, it has been found that a weight of 800 lbs. is quite satisfactory.

The compressing and confining wheels 15 comprise a cylindrical, rotatable body section 43 having a flange 45 extending from each end as seen best in FIGURE 5. FIGURE 2 shows two such compressing and confining wheels provided for the carriage. While one wheel may prove satisfactory, it has been found that a pair of wheels insures that the bonding will be complete.

As has been previously mentioned, the wheels 15 cooperate with the track 17 to comprise the compressing and confining means 13. The track 17 is shown best in the embodiment of FIGURES 3, 4, and 5 and comprises a base portion 47 supporting a center rail 49 and a pair of outer rails 51 and 53. The track is disposed on a surface 54 such as the floor of a warehouse. The center rail is located intermediate the outer rails and is separated from the outer rails by guide channels 55. The track may be of any desired length, but is preferably somewhat longer than the width of the widest carpet to be cut. In the embodiment of FIGURE 1, the track is shown as extending the length of the warehouse so as to accommodate a number of rolls 20 of the carpet disposed along the wall.

As can be seen in FIGURE 5, when the carpet is draped across the track and the carriage is disposed over the carpet and track, the body section 43 of the compressing wheel 15 is positioned directly above the center rail 49 of the track 17 with the flanges 45 directly above the guide channels 55. As can be seen in FIGURE 5, cooperation of the center rail of the track 17 and the body section 43 of the compressing and confining wheel 15 compresses the carpet in the area where the bonding material is distributed, and the cooperation of flanges 45 and the channels 55 confine the flow of the bonding material to the distance between the flanges as the compressing takes place. In addition, any bonding material which is distributed along the path traversed by the flanges 45 will be compressed by the flanges to form a groove 57 in the bonded edge of the carpet 58, a portion of which is shown in FIGURE 7.

The compressing and confining wheels 15 are suitably attached to the carriage 11 by an axle 59 (FIGURE 2) which is journalled in a pair of housings 61. The wheels 15 are positioned intermediate the housings. As shown in FIGURE 2, the axle 59 of one of the wheels 15 extends a distance past the journal which is furthest removed from the carpet rolls 20. Fixably attached to this extension of the axle is a sprocket 63 which is adapted to cooperate with a sprocket chain 65 of the driving means of the carriage.

In order that the carpet may be cut in the same operation as the bonding, the cutter assembly 19 is provided at each end of the carriage. The cutter assembly is shown best in FIGURES 2 and 3 and comprises a pair of spaced angle members 67 which are fastened to an end bracket member 69. The angle members are fastened to the upper edge of the bracket 69 and in a manner such that upstanding flange portions 71 of the members are parallel and base portions 73 extend away from each other.

Fixed to each end of each angle member base portion 73 and extending upwardly therefrom is a supporting rod 75. The rods 75 pass through openings 77 in a pair of spaced braces 79 which extend laterally across the bottom of the carriage 11. Biasing means in the form of a coil spring 81 are interposed between the lower surface of the braces 79 and the upper surface of the base portions 73 of the angle members 67 and urge the angle members in a downward direction. A plate 83 is fastened to the upper ends of the rods 75 and serves to limit the downward movement of the angle members 67.

Means are provided for raising or lowering the angle members and comprise a pair of spaced cams 85 interposed between the upstanding portions of the spaced angle members 67. The cams are fixed to a cam shaft 87 which is journalled in a pair of brackets 89 which are fixed to opposite sides of the lower surface of the carriage. The cam shaft 87 is generally centrally located with respect to the angle members 67 and intermediate the spaced braces 79 attached to the lower surface of the carriage. The cams 85 are generally circular in shape but are eccentrically positioned on the cam shaft 87.

The cam shaft and cams are so located that the cams are in constant contact with the lower surface of the plate 83. The cams are fixed to the cam shaft in such a manner that when the shaft is rotated, the plate 83 will be urged in an upward direction or allowed to move in a downward direction by reason of the biasing means 81. A flattened portion 81 is provided on the surface of the cam so that when the plate 83 is in the fully raised position, it will tend to remain there. Means are provided for manually rotating the cam shaft 87 and comprise a lever arm 93 having a handle 95. It should be apparent, however, that means might also be provided for rotating the cam shaft automatically without departing from the scope of the invention.

The actual cutting operation is accomplished by means of a cutting disk 97 provided with a central shaft 99 which is journalled in suitable bearings 100 located on the under surface of the angle members 67. As can be seen in FIGURE 3, the shaft 99 extends past one of the bearings 100 and is provided with a suitable pulley 101 on its extended end. The pulley 101 is adapted to receive a belt 102 which is connected to a driving means or motor 103 supported on the top of the carriage. Each cutter assembly 19 is provided with a separate motor 103 and 103a so only one cutting disk 79 need be rotating at a time. An idler assembly 104 is attached to the side of the carriage to take up the slack of the belt 87 when the cutter assembly is raised.

Thus far in the discussion, the apparatus has been described as having a compressing and confining means, as well as a cutting means. It should be understood, however, that it is possible to bond the edge of the carpet in the manner shown after the cut has been made. In other words, the compressing and confining operation, and the cutting operation may be separated into two independent steps without departing from the scope of the invention.

It has been found that lifting the carpet slightly during the cutting operation greatly improves the cutting action of the disk 97. Accordingly, a lifting shoe 105 is shown attached to the cutter assembly 19 and adjacent the cutting disk by means of a bracket 107. The lifting shoe 105 is generally L-shaped and has a flat base portion 109 and a circular threaded vertical portion 111. The vertical portion 111 is attached to the bracket 107 which is in turn suitably fastened to the end bracket 69 of the angle members 67.

The base portion of the lifting shoe is of a slotted design having a slot 113 into which the cutting disk extends. During the cutting operation, the carpet will lie across the upper surface of the shoe and below the cutting disk 97, as shown in FIGURE 4. This causes the carpet to be forced against the disk and insures better cutting action. The cooperation of the lifting shoe 105 and the independently rotating cutting disks make it unnecessary for the cutting disk to be in actual contact with the track 17. This feature, shown in FIGURE 4, insures that the disk will not become dulled by contact with the rail.

Driving means are associated with the carriage of the preferred embodiment for providing locomotion, and comprise generally a motor 115 provided with a suitable sprocket 117 attached to the motor shaft 119. The sprocket is connected by means of an endless sprocket chain 121 to a shaft 123 journalled in suitable bearings which are supported on the top of the carriage. The shaft 123 has attached thereto a driven sprocket 125, a compressing wheel drive sprocket 127, and the carriage driving sprocket 37 mentioned above which engages the chain 35 to propel the carriage, as shown in FIGURE 3.

The driven sprocket 125 is connected by means of the sprocket chain 121 to the drive sprocket 117 of the motor 115 and is the means whereby rotation is supplied to the shaft 123. FIGURE 2 shows the sprocket 125 of the shaft somewhat larger than the sprocket 117 of the motor so as to accommodate the speed of the motor to the desired speed of the shaft.

The compressing wheel drive sprocket 127 is connected by means of a sprocket chain 129 to a sprocket 131 attached to a lay shaft 133, which is journalled in suitable bearings near the lower portion of the carriage 11. The shaft 133 is provided with a second sprocket 135 which is connected by means of the sprocket chain 65 to a third sprocket 63 attached to the axle 59 of the compressing and confining wheels 15. Hence, driving power is also supplied by one of the two compressing and confining wheels 15. The indirect method of coupling the wheels 15 to the motor 115 is partially for the purpose of being unable to readily vary the speed of the wheels 15 with relation to the speed of the motor by changing the sizes of the sprockets in this drive means.

The driving rack sprocket 37, as shown in the embodiment of FIGURE 3, is attached to the end of the shaft 123 and positioned so that the teeth of the sprocket cooperate with the sprocket chain 35 fastened in the channel 33 on the elevated beam 25. The cooperation between the sprocket 37 and the sprocket chain 35 of the elevated beam 25 provides a second driving means for the carriage 11. It is desirable to have two such means of locomotion for the carriage because of the total weight of the carriage involved and the difficulty encountered in moving it. It is particularly desirable that all of the locomotion is not provided by the compressing and confining wheels 15, since these wheels may have a tendency to slip or spin and may cause damage to the carpet.

The bonding material may be distributed manually, or may be distributed by a spreading means 137 located adjacent the compressing wheels 15. The spreading means 137 includes a dispensing nozzle 139 and a suitable reservoir and metering means (not shown).

A bonding material found quite satisfactory is rubber latex, but it should be clear that many materials having a controllable viscosity and suitable adhesive characteristics could be used. It would be possible, for example, to provide the compressing and confining means with suitable heat generating properties, and use a thermoplastic material as the bonding agent.

In order to insure that the carpet will not slide or form a pocket while being cut, it has been found desirable to provide a clamping means 141 adjacent the track 17. The clamping means comprises a holding bar 143 hingedly attached to the surface 54 by means of suitable rotatable arms 145 and hinge brackets 146, and contains holding pins 147 which engage the carpet and limit its movement. The hinge brackets are so located that the carpet will occupy a position between a pair of brackets when the carpet is laid across the track prior to the cutting and bonding operation. A preferred construction might comprise several brackets disposed on the cutting surface and separated by a distance somewhat greater than the width of the roll of carpet which will lie between any particular pair. In this manner, the holding bar is supported along its length, but will not interfere with the carpet as it lies across the track.

The clamping means 141 is so located relative to track 17 that, when the holding bar is in the clamping position, it is located immediately above one of the outer rails 51 or 53 of the track 17. While a location above either of the outer rails would be satisfactory, it has been found preferable to have the bar 143 adjacent the outer rail which is nearest to the roll of carpet.

In order that the movements of the carriage 11 may be properly controlled, and that various safety features may be provided, an electrical control system such as that shown diagrammatically in FIGURE 8 has been provided.

With reference to FIGURE 8, the electrical system of the preferred embodiment is connected to a three-phase power supply (not shown) by terminals shown at 153. The driving motor 115 is connected to the terminals through contact 155 and 157 of relays soon to be described. The contacts are controlled by the relays and serve to allow or prevent current flow to the motor depending upon whether they are in an open or closed position. When the contacts 157 are open, the direction of rotation of the motor will be such that the carriage will move in a forward direction, or to the left, as shown in FIGURE 2. When the contacts 157 are closed and the contacts 155 are open, the direction of rotation of the motor will be reversed and the carriage will move to the right (FIGURE 2).

The contacts 155 and 157 are controlled by a forward relay 159 and a reverse relay 161 respectively. The relays are connected across the carriage driving motor 115 and in parallel to each other. In this manner, it is possible to energize one of the relays without energizing the other.

Current flow to the forward and reverse relays is controlled by forward and reverse control switches 163 and 165. These switches close the circuit to the relay coils and determine the direction in which the carriage will move. Forward and reverse control switch contacts 167 and 169 are connected in parallel to the control switches and are energized by the forward and reverse relays 159 and 161. The contacts 167 and 169, when closed, insure that current will continue to be supplied to the relay coils, which coils in turn retain the contacts in a closed condition. This feature makes it necessary to close the control switches 163 or 165 only long enough for the relays 159 or 161 to be energized and the control contacts 167 or 169 to be closed. For this reason, it is possible to design the control switches to be of the spring-loaded, push-button type.

As has been previously discussed, it is desirable that one of the cutter assemblies 19 be elevated for each pass which the carriage makes over the carpet. If this were not so, the leading cutting disk would cut the carpet prior to any bonding by the compressing and confining wheels. While this may provide a satisfactory bond for the carpet, it has been found desirable to raise the leading cutter assembly and pass both compressing and confining wheels over the carpet prior to cutting.

Accordingly, forward and reverse safety switches 171 and 173 are connected in series with the relays 159 and 161. In this manner, unless its corresponding switch is closed, the relay will not be energized and the motor 115 will not operate. The safety switches are opened and closed by the position of the cutter assemblies. When the left (forward) cutter assembly is raised, the forward safety switch will be closed and it will be possible for the carriage to move forward (left) as in FIGURE 2 if the control switch 163 is closed. However, when the left cutter assembly is lowered, the forward safety switch is open and no movement in the forward direction is possible.

In order that movement of the carriage will cease automatically when the carriage has passed a predetermined point, forward and reverse limit switches 175 and 177 are connected in series with the forward and reverse control switches 163 and 165. These switches are shown in FIGURE 2 as being located on each end of the carriage and serve to shut off the motor 115 should the operator forget to do so.

Connected in series with the switch and relay circuits is a stop switch 179. The stop switch is not shown in the preferred embodiment of the apparatus, but may be a spring-loaded, push-button switch similar to the forward and reverse control switches 163 and 165. The stop switch need only be open long enough to interrupt current flow to the relays. Such an interruption will allow the forward or reverse control contacts 167 or 169 to open. If the stop switch is again closed, current will not begin to flow to the relays until either the forward or reverse control switch is closed long enough to close one of the control contacts.

The circuit shown in the preferred embodiment of FIGURE 8 also supplies power to the forward and reverse cutter motors 103 and 103a. The motors are shown as connected in parallel to the driving motor 115. Relay contacts 181 and 183 are connected in series to the motors and allow current to flow to the motors only when they are closed.

The cutter motor relay contacts 181 and 183 are controlled by cutter motor relays 185 and 187 which are connected in parallel to the reverse and forward relays 161 and 159. It should be noted that the cutter motor relay 185 for the left (forward) motor 103 (see FIGURE 2)

is connected in series to the reverse control switch 165, whereas the cutter motor relay 137 for the right motor 103a is connected in series to the forward control switch 163. In this manner, when it is desired to move the carriage to the left (forward), and the forward control switch is closed, the right cutter disk will rotate. This is as desired, since the left, or forward, cutter disk will be in the raised position when the carriage moves in that direction, and no rotation is desired.

Throughout the discussion, movement of the carriage to the left has been referred to as the forward direction, and movement to the right as the reverse direction. It should be clear, however, that this designation was merely for ease of description and the carriage operates equally well while moving in either direction.

The general operation of a system provided with the invention can best be seen with reference to FIGURE 1. This figure shows a series of rolls 20 of carpet disposed along a wall 149 of a warehouse. They might also be supported independently of the wall by various means not shown.

Disposed parallel to the rolls is the track 17, and the carpet clamping means 141 are located intermediate the track and the rolls of carpet. When it is desired to cut a portion of carpet from one of the rolls, a piece of that carpet is unrolled and draped across the track 17.

Measurements are taken to insure that the portion of the carpet along which the cut is to be made lies in proper relation to the track, and the holding bar 143 is then placed over the carpet. If the bonding material is to be distributed manually, this is now done, using the holding bar as a guide, and the carriage 11 is then passed over the carpet, bonding it and providing the cut. Otherwise one of the applicators 139 distributes the bonding material in advance of the wheel 15.

A portion of a carpet 58 having a bonded edge such as that provided by the above described apparatus is shown in FIGURE 7. In general, it has been found that a ⅜ inch thick reversible basket-weave type carpet is compressed to a ⅛ inch thick edging. That is, the carpet at the bonded edge is about ⅓ as thick as the non-bonded portion.

It is well to note also that a carpet bonded in accordance with the present invention will have a bonded edge in which the ornamental pattern of the carpet is maintained. This represents a decided advantage over the method previously used of fastening another piece of fabric around the freshly cut edge, since the edge retaining the ornamental pattern is generally more attractive than a binding fabric, and the necessity of finding a strip of fabric which matches the carpet being bound is eliminated.

It should be noted that the bonding material is compressed into the carpet. It is done so in a manner which will thoroughly impregnate the carpet with the material. In this manner, the compressing and confining means cooperate with each other, for if the bonding material were compressed and not confined, it would spread over the surface of the carpet and form a backing rather than a bonding. Since the flow of the material is confined to a definite width, the compressing will force the material into the carpet to produce a thoroughly impregnated strip.

An apparatus has thus been described which makes it possible to rapidly bond a portion of carpet and then to cut along a line defined by the bonding so as to provide a cut-edge which will not unravel. The apparatus also makes it possible to bond an edge of carpet, or to cut a carpet and then bond the freshly cut edge.

While one preferred embodiment of the invention has been set forth, it should be clear that various modifications might be made without departing from the scope of the present invention.

Various of the features of the present invention are set forth in the following claims.

What is claimed is:

1. An apparatus for cutting a carpet while at the same time compressing into the carpet a quantity of bonding material distributed along the line on which the cut is to be made, and comprising a track disposed upon a supporting surface and adapted to support the carpet in overlying relation thereto, a movable weighted carriage disposed in overlying relation to, and supported by, said carpet and said track, said carriage including a rotatable means adapted to cooperate with said track and compress said bonding material into said carpet, means associated with said rotatable means adapted to cooperate with said track and confine the flow of said bonding material to a predetermined width, and a cutting means associated with said carriage which is adapted to cut said carpet along a line contained within the compressed area.

2. A self-propelled arrangement for cutting a carpet while at the same time compressing into the carpet a quantity of bonding material distributed along the line on which the cut is to be made, and comprising a track disposed upon a supporting surface and adapted to support the carpet in overlying relation thereto, a movable weighted carriage disposed in overlying relation to, and supported by the carpet and said track, a rotatable means on said carriage adapted to cooperate with said track and compress said bonding material into said carpet, means associated with said rotatable means for confining the flow of said bonding material to a predetermined width, a cutting disk associated with said body section which is adapted to cut said carpet along a line contained within the compressed area, and a lifting means associated with said carriage and suitably disposed adjacent said cutting disk to raise said carpet against said disk during the cutting operation.

3. A self-propelled apparatus for cutting a carpet while at the same time compressing into the carpet a quantity of bonding material distributed along the line on which the cut is to be made, and comprising a track disposed upon a supporting surface and adapted to support the carpet in overlying relation thereto, said track including a center rail, and an outer rail located on each side of said center rail and separated therefrom by a channel, a fastening means associated with said supporting surface and with said track for maintaining the portion of the carpet which is to be bonded and cut in relatively flat condition, a movable weighted carriage disposed in overlying relation to, and supported by, the carpet and said track, means for driving the said carriage, a rotatable means adapted to cooperate with said track and compress said bonding material into said carpet and comprising a cylindrical body, means associated with said rotatable means for confining the flow of said bonding material to a predetermined width and comprising flanges extending radially from the ends of said cylindrical body of said rotatable means and adapted to cooperate with the channels of said track, a cutting means associated with said compressing and confining means which is adapted to cut said carpet along a line contained within the compressed area, and a lifting means suitably disposed adjacent said cutting means to raise said carpet against said cutting means as said carriage moves along said track.

4. In a carpet bonding and cutting apparatus which includes a carriage movable along a predetermined path and provided with a reversible electric motor for providing the moving power for said carriage, said carriage having a forward and rearward end and having a cutting means adjacent each of said ends capable of vertical movement to an elevated or a lowered operative position, the combination of a safety switch associated with each of said cutting means which is actuated by vertical movement of said cutting means and which is operable to control the flow of current to said motor so as to prevent movement of the carriage in a particular direction when the cutting means is in the lowered position, and a limit switch associated with said carriage to prevent the flow of current to said motor after said carriage has passed a predetermined point on said path.

References Cited in the file of this patent

UNITED STATES PATENTS

| | | |
|---|---|---|
| 1,112,134 | Hansing | Sept. 29, 1914 |
| 2,057,264 | Pierce | Oct. 13, 1936 |
| 2,225,497 | Greiser | Dec. 17, 1940 |
| 2,236,968 | Cunnington | Apr. 1, 1941 |
| 2,605,840 | Parker | Aug. 5, 1952 |
| 2,723,937 | Rice | Nov. 15, 1955 |
| 2,753,597 | Bird et al. | July 10, 1956 |
| 3,042,564 | Hankins | July 3, 1962 |

FOREIGN PATENTS

| | | |
|---|---|---|
| 33,907 | Denmark | Nov. 13, 1924 |